(12) United States Patent
Yamamoto et al.

(10) Patent No.: US 7,374,000 B2
(45) Date of Patent: May 20, 2008

(54) ELECTRIC GENERATING SYSTEM FOR AUTOMOBILES AND ITS CONTROL METHOD

(75) Inventors: Tatsuyuki Yamamoto, Hitachinaka (JP); Yoshinori Fukasaku, Hitachinaka (JP); Keiichi Mashino, Hitachinaka (JP); Yuuji Maeda, Hitachiota (JP); Susumu Tajima, Hitachinaka (JP); Hisaya Shimizu, Hitachinaka (JP); Keisuke Nishidate, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/793,425

(22) Filed: Feb. 27, 2001

(65) Prior Publication Data

US 2001/0017225 A1 Aug. 30, 2001

(30) Foreign Application Priority Data

Feb. 28, 2000 (JP) ............................. 2000-051826

(51) Int. Cl.
*B60K 1/00* (2006.01)

(52) U.S. Cl. ..................... 180/65.2; 180/65.4; 180/243

(58) Field of Classification Search ............... 180/65.2, 180/65.3, 65.4, 65.8, 242, 243; 701/22
See application file for complete search history.

(56) References Cited

U.S. PATENT DOCUMENTS

| | | | | |
|---|---|---|---|---|
| 3,057,427 A * | 10/1962 | Glasgow | ...................... | 105/61 |
| 4,593,779 A | 6/1986 | Krohling | | |
| 4,923,025 A * | 5/1990 | Ellers | ........................ | 182/65.2 |
| 4,953,646 A | 9/1990 | Kim | | |
| 5,336,932 A * | 8/1994 | Barske | ........................ | 290/1 R |
| 5,415,245 A | 5/1995 | Hammond | .................. | 180/165 |
| 5,689,174 A | 11/1997 | Pacheco, Sr. | | |
| 6,044,923 A * | 4/2000 | Reagan et al. | ............... | 180/291 |
| 6,321,865 B1 * | 11/2001 | Kuribayashi et al. | ........ | 180/243 |

FOREIGN PATENT DOCUMENTS

| | | |
|---|---|---|
| EP | 0543390 | 11/1992 |
| FR | 2778873 | 11/1999 |
| JP | 48-002506 | 1/1973 |
| JP | 53-55105 | 1/1978 |
| JP | 53-55105 | 5/1978 |
| JP | 55-110328 | 1/1979 |
| JP | 55-110328 | 8/1980 |
| JP | 55-127624 | 9/1980 |
| JP | 55-138129 U | 10/1980 |
| JP | 63-17501 | 2/1988 |
| JP | 63-38031 | 2/1988 |
| JP | 63-203426 | 8/1988 |
| JP | 05-008639 | 1/1993 |
| JP | 06-030585 | 2/1994 |
| JP | 7-9006 | 7/1995 |
| JP | 7-231508 | 8/1995 |

(Continued)

*Primary Examiner*—Bradley King
(74) *Attorney, Agent, or Firm*—Crowell & Moring LLP

(57) ABSTRACT

To provide a vehicle driving apparatus capable of providing a sufficient driving force. A driving high-power generator is driven by an engine. A DC motor is driven directly by energy from the generator. A driving generator output voltage control circuit controls output voltage of the generator in accordance with the demanded driving force from the vehicle to control the motor.

7 Claims, 4 Drawing Sheets

FOREIGN PATENT DOCUMENTS

| | | |
|---|---|---|
| JP | 07-277069 | 10/1995 |
| JP | 08-126117 | 5/1996 |
| JP | 9-2090 | 1/1997 |
| JP | 09-219905 | 8/1997 |
| JP | 09-263150 | 10/1997 |
| JP | 09-280083 | 10/1997 |
| JP | 09-315164 | 12/1997 |
| JP | 11-291774 | 10/1999 |

\* cited by examiner

ELECTRIC GENERATING SYSTEM FOR AUTOMOBILES AND ITS CONTROL METHOD

BACKGROUND OF THE INVENTION

The present invention relates to a vehicle driving apparatus for driving four wheels of the vehicle using an engine and an electric motor.

A convention vehicle driving apparatus has been known, for example, from JP-A No. Hei 9-2090 (published in 1997), wherein a driving battery is utilized, and only at a low μ road for which start assistant is necessary, a 12-V alternator and a 12-V battery for ancillaries are combined to operate a motor. Another system is known, for example, from JP-A No. Hei 7-231508 (published in 1995), which discloses a system for driving a motor in combination with a 12-V alternator and a 12-V battery for ancillaries.

However, the conventional system having, as a power source, a 12-V generator and a 12-V battery for ancillaries has a problem that electric energy that can be brought from the 12-V battery (for ancillaries) is small, and the period used for 4WD running is limited. Thus, for the continuous up-hills, in which high power must be supplied for a long period of time, the system fails to exhibit sufficient performance.

It is an object of the present invention to provide a vehicle driving apparatus capable of providing the sufficient driving force.

SUMMARY OF THE INVENTION

To achieve the aforementioned object, the present invention provides a vehicle driving apparatus comprising: a first generator driven by an internal combustion engine, the first generator being provided separately from a second generator for ancillaries for supplying electric power to ancillaries of the vehicle; a motor drivingly driven by energy from the first generator; and control means for controlling output voltage of the first generator in accordance with a driving force requested from the vehicle to control the motor, wherein either the front wheels or the rear wheels of the vehicle are driven by the internal combustion engine, while the other wheels are driven by the motor. The exclusive-use generator and motor are thus used to obtain the sufficient driving force.

Preferably, electric power supplied to the motor is supplied only from output of the first generator, and the output voltage of the first generator is controlled by field current control of the first generator to control the driving force generated by the motor. In addition, when electric power is not supplied to the motor, the first generator preferably supplies electric power to the electric loads.

Other objects, advantages and novel features of the present invention will become apparent from the following detailed description of the invention when considered in conjunction with the accompanying drawings.

DESCRIPTION OF THE PREFERRED EMBODIMENTS

Figure 1:
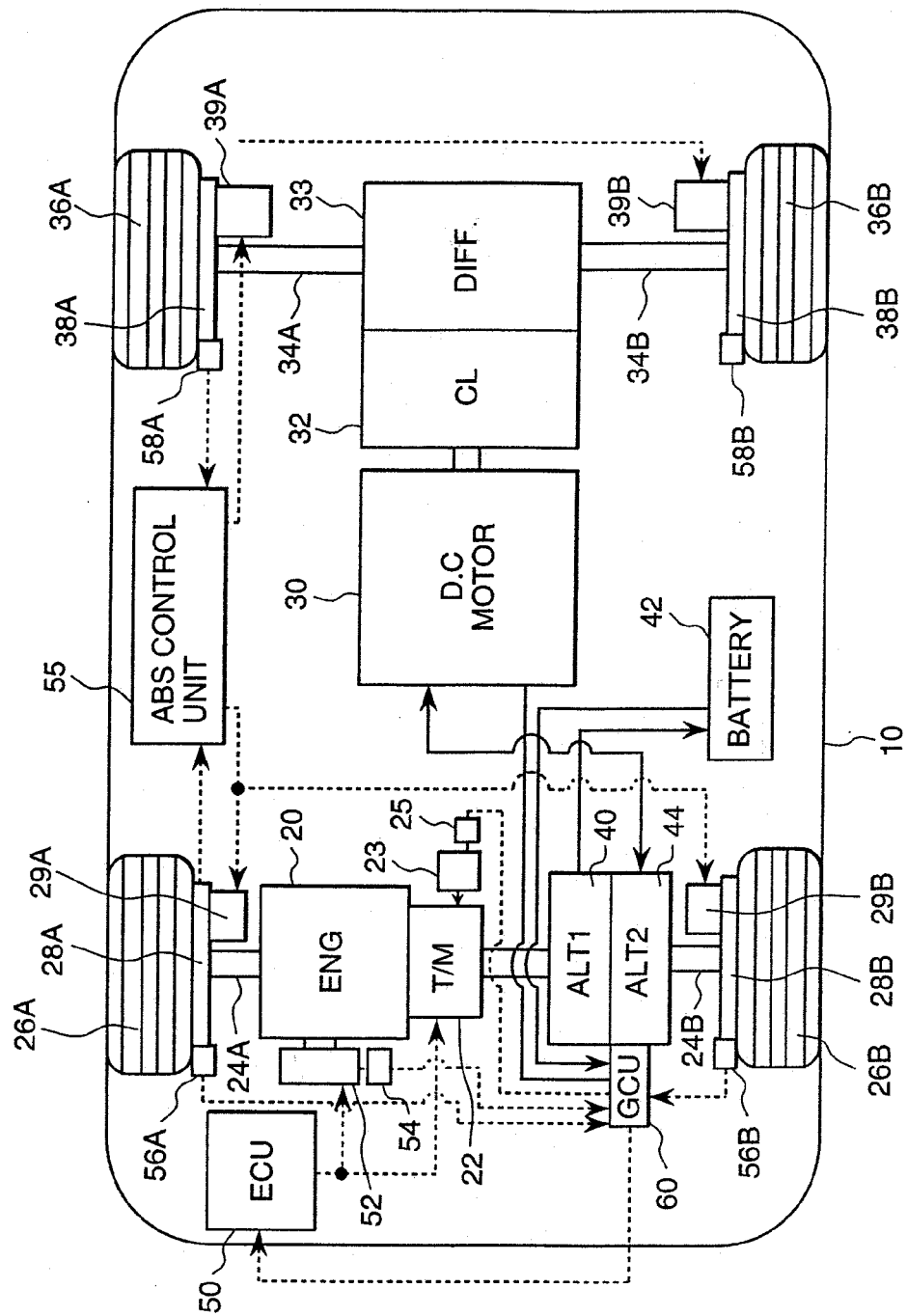
FIG. 1 is a block diagram of a 4-wheel drive vehicle using a vehicle driving apparatus according to one embodiment of the present invention.

FIG. 1 illustrates the configuration of a 4-wheel drive vehicle using a vehicle driving apparatus according to one embodiment of the present invention.

The 4-wheel drive vehicle 10 is provided with an engine 20 and a DC motor 30. The driving force of the engine 20 is transmitted to front wheels 26A, 26B through a transmission 22 and first axles 24A, 24B. The driving force of the DC motor 30 is transmitted to rear wheels 36A, 36B through a clutch 32, a differential gear 33 and second axles 34A, 34B. When the differential gear 33 and the clutch 32 are connected, they transmit the rotating force of the DC motor 30 to drive rear wheel axles 34A, 34B. When the clutch 32 is disengaged, the DC motor 30 is mechanically separated from the rear wheels 36A, 36B, so that the rear wheels 36A, 36B do not transmit the driving force to the road surface. The DC motor may be, for example, a DC shunt-wound motor which is easily switched from a forward operation to a reverse operation and vice versa, or a separately excited DC motor.

While in the foregoing description, the front wheels 26A, 26B are driven by the engine 20, and the rear wheels 36A, 36B are driven by the DC motor 30, it should be noted that the front wheels may be driven by the DC motor, and the rear wheels driven by the engine. Furthermore, the invention can also be applied to vehicles in excess of 6-wheel such as a truck, and traction vehicles such as a trailer.

Within the engine compartment are arranged a generator for ancillaries (ALT1) 40 for performing normal charging and generation system and a battery for ancillaries 42. The output of the generator for ancillaries 40, which is belt-driven by the engine 20, is stored in the battery for ancillaries 42. Further, a driving high-power generator (ALT2) 44, which is also belt-driven by the engine 20, is disposed in the vicinity of the generator for ancillaries 40. The DC motor 30 (armature winding 30A, FIG. 2) is driven by output of the driving high-power generator 44. While the generator 40 for example, has a capacity of about 12V, 2 kW, the driving high-power generator 44 is capable of obtaining higher power, for example, about 36V, 6 kW.

Output of the engine 20 is controlled by an electronically controlled throttle valve 52 driven by a command issued from an engine control unit (ECU) 50. The electronically controlled throttle 52 is provided with an accelerator opening-degree sensor 52 to detect an opening-degree of the accelerator. Where an accelerator pedal of a mechanical link and a throttle valve are used in place of the electronically controlled throttle valve, an accelerator opening-degree sensor can be provided on the accelerator pedal. Further, ECU 50 controls the transmission 22. The transmission 22 is an automatic transmission, which is automatically controlled so as to provide a gear ratio selected by a selection lever 23. The position of the selection lever 23 is detected by a gear position detection sensor 25. It is noted that the transmission 22 may be a manual transmission.

Brakes 28A, 28B, 38A and 38B provided on the front wheels 26A, 26B and the rear wheels 36A, 36B, respectively, are provided with anti-lock brake (ABS) actuators 29A, 29B, 39A and 39B controlled by an anti-lock brake (ABS) control unit 55. Further, the front wheels 26A, 26B and the rear wheels 36A, 36B, respectively, are provided with rotation sensors 56A, 56B, 58A and 58B for detecting the rotational speed and the rotational direction. The rotation sensors 56A, 56B, 58A and 58B are provided every wheel, but may be disposed on one of or both the front wheel axle and the rear wheel axle.

A driving generator output voltage control circuit (GCU) 60 calculates vehicle speeds on the basis of the rotational speed of the wheels 26A, 26B, 36A and 36B detected by the rotation sensors 56A, 56B, 58A and 58B, and controls the driving high-power generator 44 and the DC motor 30 on the basis of the calculated vehicle speeds. The details of the control by the GCU 60 will be described referring to FIG. 3.

Figure 2:
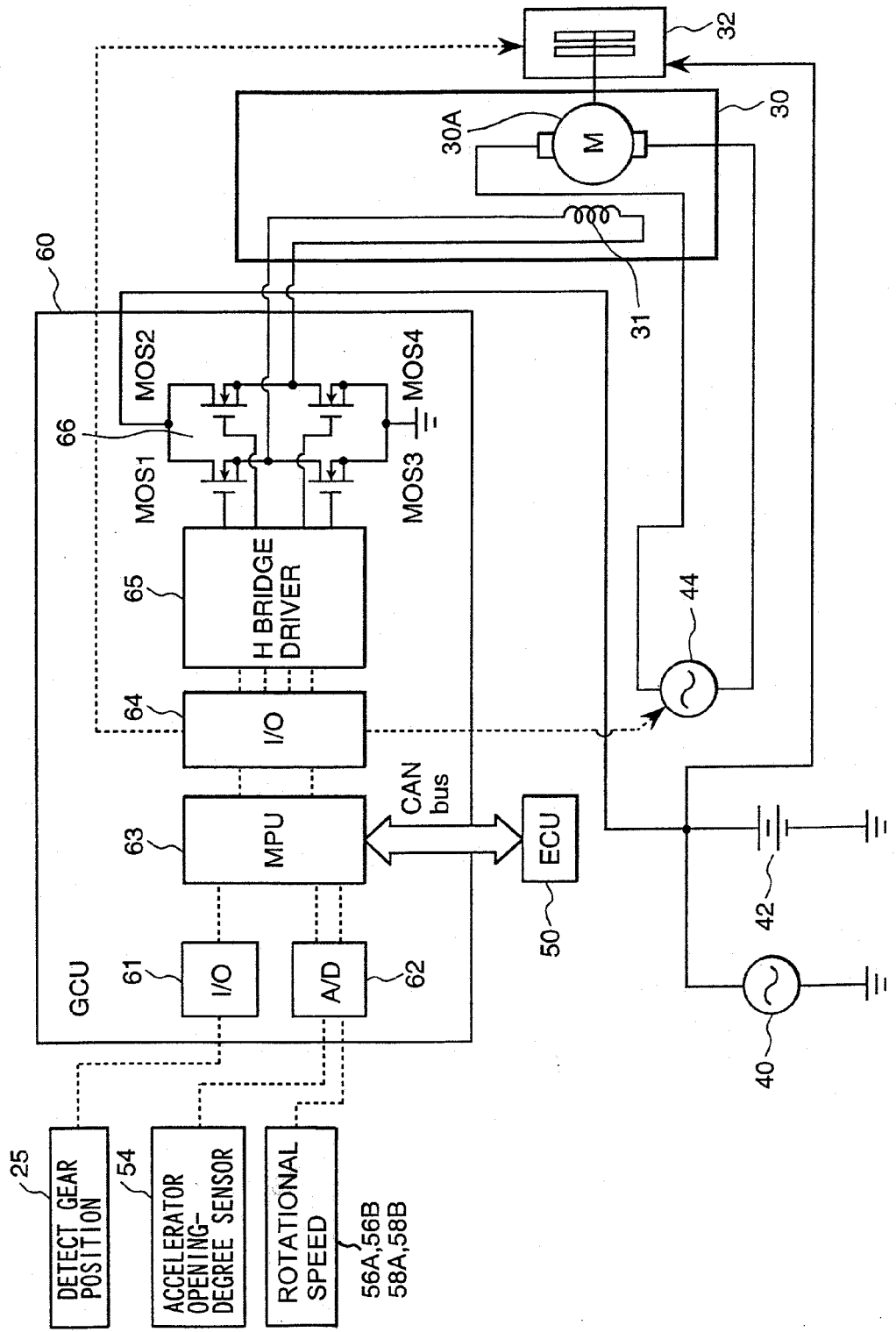
FIG. 2 is a block diagram of the vehicle driving apparatus according to one embodiment of the present invention.

The vehicle driving apparatus according to the present embodiment will be further described with reference to FIG. 2, which is a block diagram of one embodiment of the present invention, including an example of circuits for power supply and controls. The same reference numerals as those of FIG. 1 indicate the same parts; the solid line indicates a connection of power supply, while the broken line indicates connection for controls. Information on the rotational speed and direction of the wheels 26A, 26B, 36A, 36B detected by the rotation sensors 56A, 56B, 58A and 58B, accelerator opening-degree detected by the accelerator opening-degree sensor 54, and the gear position detected by the gear position detection sensor 25, is input into the driving generator output voltage control circuit (GCU) 60.

GCU 60 outputs a command value for output voltage to the driving high-power generator (ALT2) 44 to control the output voltage of the high-power generator 44 so that the DC motor 30 is controlled. GCU 60 also controls a field current that flows into a field winding 31 of the DC motor 30 so as to directly control the DC motor, thus improving the response resulting from the proposition that the DC motor 30 is controlled by the high-power generator 44.

The driving generator output voltage control circuit (GCU) 60 is provided with an I/O circuit 61, an A/D converter 62, a micro processor (MPU) 63, an I/O circuit 64, an H bridge driver 64 and an H bridge circuit 66. Gear position information detected by the gear position detection sensor 25 is fetched into the MPU 63 through the I/O circuit 61. Information of the rotational speed and rotational direction of the wheels 26A, 26B, 36A, 36B detected by the rotation sensors 56A, 56B, 58A and 58B, and information of an accelerator opening-degree detected by the accelerator opening-degree sensor 54 are fetched into the MPU 63 through the A/D converter 62. The MPU 63, which has a memory for holding programs and data for controlling the CPU and the motor, calculates vehicle speeds in accordance with the input information, and calculates an output voltage value for the driving high-power generator 44. The latter is supplied from the I/O circuit 64 to the driving high-power generator (ALT2) 44, to control the output voltage value generated. The MPU 63 regulates a field current flowing into the field winding 31 of the DC motor 30 in the H bridge circuit 66 through the H bridge driver 65. When the vehicle is moved in the reverse direction, a field current is caused to flow in the direction opposite to that of the forward operation by the H bridge circuit 66 to obtain the reverse driving force similar to that of the advance of the vehicle. Further, the MPU 63 provides connection and disconnection signals to the clutch 32 via the I/O circuit 64.

While in the foregoing, each sensor signal is directed input into the driving generator output voltage control circuit 60, it is noted that the signal may be available via an in-vehicle LAN (CAN) from the control units with the sensor amount loaded (for example, such as ECU 50 and ABS control unit 55).

The battery for ancillaries 42 is a 12-V battery, which constitutes a normal charge-discharge system between the generator for ancillaries 40 and various electric loads associated with the 12 V power supply. The field-side power supply for the DC motor 30 and for the driving high-power generator 44 is supplied for the generator for ancillaries 40 and the battery for ancillaries 42. Two power supply systems are provided to thereby permit control by a method for controlling a field current of the driving high-power generator 44 and a method for controlling a field current of the DC motor. For example, when the vehicle starts and the necessary rotational speed of the motor is low and the required torque is high, the output current of the driving high-power generator 44 is set to a greater value so that the motor assumes the low rotation and the output of high torque. When the vehicle is running and necessary rotational speed of the motor is high and the required torque is low, the output voltage value of the driving high-power generator 44 is set to a greater value to enable coping with the situation. Further, the field current of the DC motor 30 is lowered whereby the rotational frequency of the motor can be increased while improving the responsiveness when the vehicle runs. When a demanded torque distribution is higher in the front wheel 26 than in the rear wheel 36, the field current value of the driving high-power generator 44 is lowered to enable making the torque distribution of the front wheel 26 and the rear wheel 36 variable.

The power supply for the clutch 32 is provided by the battery for ancillaries 42, and the connection and disconnection of the clutch 32 are controlled by the MPU 63 such that when 4-wheel drive is not necessary, the mechanical connection between the rear wheels 36A, 36B and the DC motor 30 can be forcibly disengaged without depending on the constantly changing generative force of the driving high-power generator 44. For example, when the vehicle speed reaches 20 km/h, the clutch 32 is turned OFF to provide the driving system for only the front wheels whereby wear of the brush of the DC motor 30 can be reduced as compared to the system which operates in the whole vehicle speed region. Further, in the state that the clutch 32 is disengaged, the DC motor 30 is not used. Thus, the driving high-power generator 44 is switched by a switch to enable using as a charging device and a power supply for other ancillaries.

Further, the motor 30 is utilized as a generator during high speed traveling on a downhill, and equipment for charging or consuming generation provided by the motor 30 is provided within the vehicle to thereby obtain the braking force such as regenerative braking and generative braking.

Figure 3:
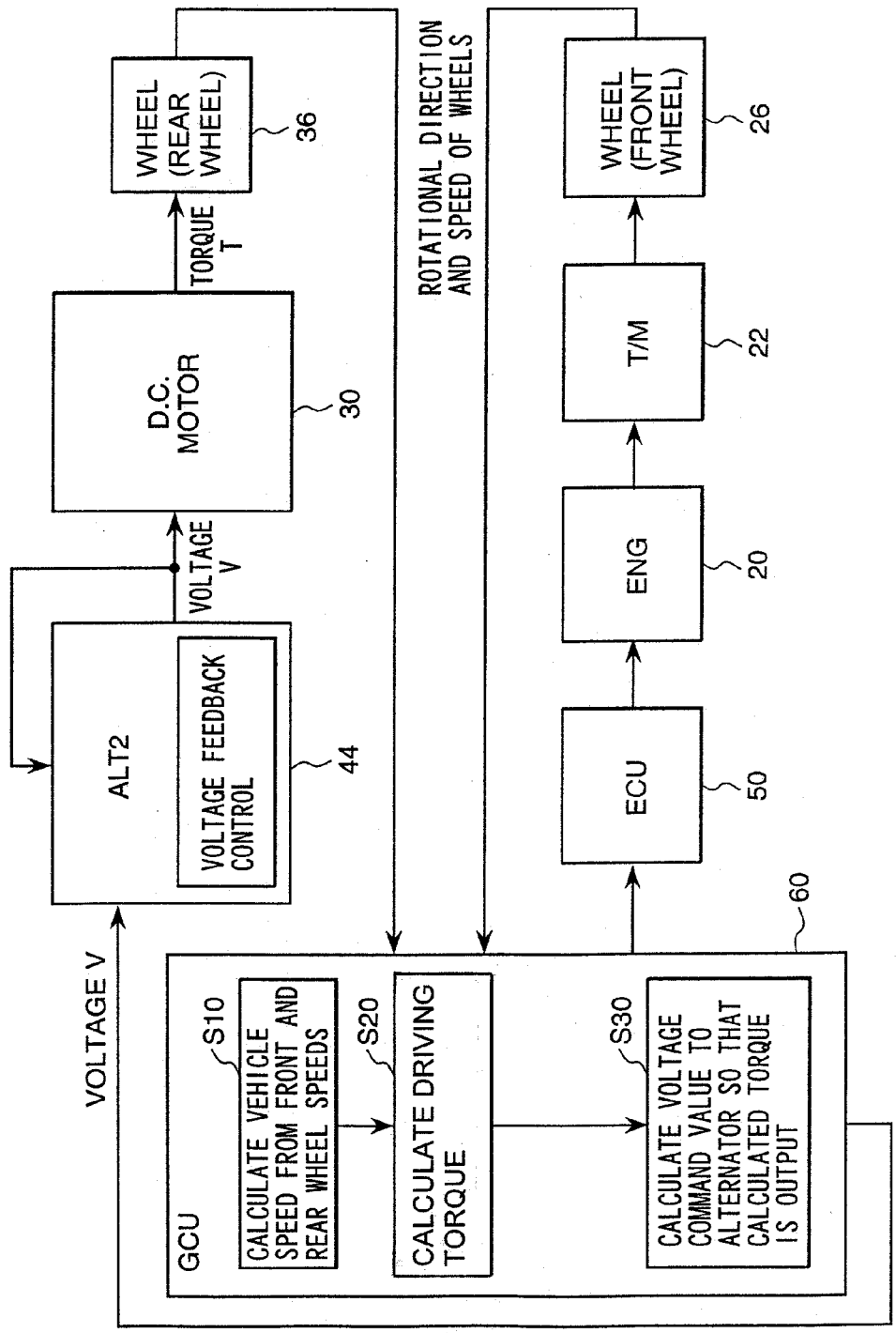
FIG. 3 is a system block diagram of a control system for the vehicle driving apparatus according to one embodiment of the present invention.
Figure 4:
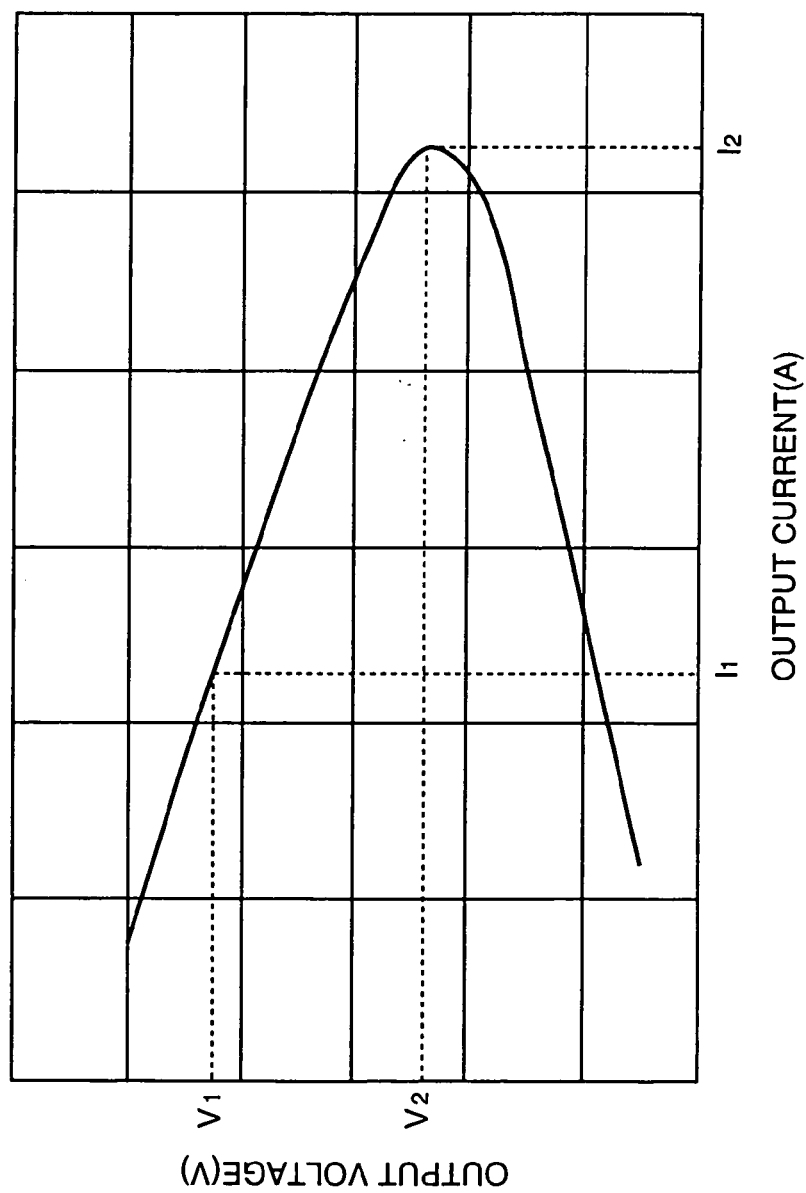
FIG. 4 is a characteristic view of a high-power generator used in the vehicle driving apparatus according to one embodiment of the present invention.

The operation of the vehicle driving apparatus according to the present embodiment will be described with reference to FIGS. 3 and 4. FIG. 3 is a system block diagram of a control system of the vehicle driving apparatus according to one embodiment of the present invention; and FIG. 4 is a characteristic view of a high-power generator used in the vehicle driving apparatus according to one embodiment of the present invention. In FIG. 3, the same reference numerals as those of FIGS. 1 and 2 indicate the same parts.

As shown in FIG. 3, it is assumed that a wheel driven through the transmission 22 of the driving force of the engine 20 is, for example, the front wheel 26, and a wheel driven by the DC motor 30 by the rear wheel 36.

Here, the contents of controlling and processing of GCU 60 will be described.

In Step s10, the GCU 60 calculates the vehicle speed on the basis of the rotational speed information of the front and rear axles input from the rotation sensors 56A, 56B, 58A and 58B.

Then, in Step s20, the GCU 60 calculates the motor driving torque required in response to the running state judged in Step s10.

Then, in Step s30, the GCU 60 calculates a voltage command value V for the driving generator 44 to obtain the calculated motor driving torque, and outputs it to the driving generator 44. The driving generator 44 performs feedback control so that its output voltage assumes the command value V, which is supplied to the DC motor 30. Real torque T of the DC motor 30 is input into the rear wheel 36 by the voltage V to assume the state of providing the actual wheel speed, and feedback control of the whole system is carried out.

Next, the characteristics of the high-power generator will be described with reference to FIG. 4, which shows the output voltage of the high-power generator 44, which output voltage can be considered as the input voltage of the DC motor 30 if a wiring resistance is excluded.

When the necessary torque is high and the vehicle speed is low (such as when the vehicle starts or when getting out of a rut), the output of the generator 44 is controlled so that the points of V2 and I2 which are high in current value to the motor 30 and relatively low in voltage value in FIG. 4 are used. Further, where the vehicle speed is low, for example, 15 to 20 km/h, some torque T is transmitted to the rear wheel 36, and the motor 30 is synchronized with the rotational frequency of the rear wheel 36 through a reduction gear. Thus, the output of the generator 44 is controlled so that the points of V1 and I1 which are relatively low in current value to the motor and relatively high in voltage value are used.

Further, when the demand for power is higher than that in the characteristics of FIG. 4, the field current of the generator 44 and the motor 30 are controlled within the allowable range of the generator 44, the motor 30 and the battery 42 to enable driving the motor 30 in the range of higher power and lower power.

As described above, according to the present invention, since sufficient driving force can be secured by directly driving the motor by the exclusive-use generator, satisfactory driving performance is obtained in comparison with that of the so-called mechanical 4WD. Further, there can be provided advantages of the original electric 4-drive (such that a propeller shaft is unnecessary, and a floor shape of the vehicle can be made flat). Further, since no battery is necessary, the cost is low, the layout in the vehicle is advantageous, and maintenance and replacement of batteries are unnecessary, resulting in simple and efficient construction and in realizing the driving apparatus having the sufficient performance.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Driving apparatus for a vehicle having front and rear pairs of wheels, one of said pairs of wheels being driven by an internal combustion engine which also drives an ancillary generator for generating electric power to operate ancillary components of said vehicle, and the other of said pairs of wheels being driven by an electric motor during a time period from a starting movement of said vehicle until it reaches a running speed at which said internal combustion engine takes over as a sole source of driving force, said driving apparatus comprising:

a high output driving generator which is driven by said internal combustion engine and has a generating output capacity greater than that of said ancillary generator, a generating output of said driving generator being supplied to an armature winding of said electric motor as a sole supply of electric power to said armature winding of said electric motor; and first control means for controlling and varying said generating output of said driving generator by controlling a magnetic field current supplied to said driving generator, based on information detected by sensors of said vehicle, thereby controlling a driving force of said electric motor; wherein said driving generator receives said magnetic field current which is controlled in accordance with said information detected by said sensors of said vehicle, and supplies said generating output to said electric motor;

said armature winding of said electric motor receives as an input only said generating output from said driving generator, and generates said driving force directly by receiving said generating output of said driving generator, during said time period from said starting movement of said vehicle until it reaches said running speed at which said internal combustion engine takes over as a sole source of driving force; and said first control means controls said magnetic field current supplied to said driving generator, such that i) an output voltage of said driving generator at said starting time of said vehicle is smaller than said output voltage of said driving generator at a running time of said vehicle at which vehicle speed is larger than at said starting time of said vehicle, and ii) an output current of said driving generator at said starting time of said vehicle is larger than an output current of said driving generator at said running time of said vehicle, whereby driving force of said electric motor at said starting time of said vehicle is larger than said driving force of said electric motor at said running time of said vehicle.

2. A driving apparatus for a vehicle according to claim 1, wherein:

said electric motor has a magnetic field winding;

said driving apparatus further comprises a second control means for controlling said driving force of said electric motor by controlling a magnetic field current supplied to said magnetic field winding of said electric motor; and when electric power is required which exceeds an output characteristic of said driving generator, in addition to a magnetic field current control of said driving generator according to said first control means, magnetic field current control of said electric motor is carried out by said second control means.

3. A driving apparatus for a vehicle according to claim 2, wherein when said electric power that exceeds said output characteristic of said driving generator is required, and when electric power is needed for increasing a rotation speed by more than a predetermined value, in addition to said magnetic field current control of said driving generator according to said first control means, said second control means carries out a lowering of said magnetic field current control of said electric motor.

4. A driving apparatus for a vehicle according to claim 1, wherein
said first control means controls said magnetic field current supplied to said driving generator to increase said driving force of said electric motor at said starting time of said vehicle, after said magnetic field current supplied to said driving generator has been controlled, to increase said output voltage and to decrease said output current, whereby said driving force of said electric motor is reduced.

5. Driving apparatus for a vehicle having front and rear pairs of wheels, one of said pairs of wheels being driven by an internal combustion engine which also drives an ancillary generator for generating electric power to operate ancillary components of said vehicle, and the other of said pairs of wheels being driven by an electric motor during a time period from a starting of movement of said vehicle until it reaches a running speed at which said internal combustion engine takes over as a sole source of driving force, said driving apparatus comprising:
- a high output driving generator which is driven by said internal combustion engine and has a generating output capacity greater than that of said ancillary generator, a generating output of said driving generator being supplied to an armature winding of said electric motor as a sole supply of electric power to said armature winding of said electric motor; and
- first control means for controlling and varying said generating output of said driving generator by controlling a magnetic field current supplied to said driving generator, based on information detected by sensors of said vehicle, thereby controlling a driving force of said electric motor; and
- clutch means for intermittently transmitting a drive force from said electric motor to said other pair of wheels; wherein
- said driving generator receives said magnetic field current which is controlled in accordance with said information detected by said sensors of said vehicle, and supplies said generating output to said electric motor;
- said armature winding of said electric motor receives as an input only said generating output from said driving generator, and generates said driving force directly by receiving said generating output of said driving generator, during said time period from said starting movement of said vehicle until it reaches said running speed at which said internal combustion engine takes over as a sole source of driving force;
- said first control means controls said magnetic field current supplied to said driving generator, such that i) an output voltage of said driving generator at said starting time of said vehicle is smaller than said output voltage of said driving generator at a running time of said vehicle at which vehicle speed of said vehicle is larger than at said starting time of said vehicle, and ii) an output current of said driving generator at said starting time of said vehicle is larger than an output current of said driving generator at said running time of said vehicle where said vehicle speed is larger than said starting time of said vehicle, whereby said driving force of said electric motor at said starting time of said vehicle is made larger than said driving force of said electric motor at said running time of said vehicle, in which said vehicle speed is larger than at said starting time of said vehicle; and
- when said vehicle speed of said vehicle reaches said running speed at which said internal combustion engine takes over as a sole source of driving force, said clutch means is activated to interrupt transmission of driving force from said electric motor to said other pair of wheels.

6. A driving apparatus for a vehicle according to claim 5, wherein
said driving apparatus further comprises a second control means for controlling a driving force of said electric motor;
said electric motor has a magnetic field winding;
said second control means controls said driving force of said electric motor by controlling a magnetic field current supplied to said magnetic field winding of said electric motor; and
when electric power is required which exceeds an output characteristic of said driving generator, in addition to a magnetic field current control of said driving generator according to said first control means, magnetic field current control of said electric motor is carried out according to said second control means.

7. A driving apparatus for a vehicle according to claim 5, wherein
said first control means controls said magnetic field current supplied to said driving generator to increase said driving force of said electric motor at said starting time of said vehicle, after said magnetic field current supplied to said driving generator has been controlled, to increase said output voltage and to decrease said output current, whereby said driving force of said electric motor is reduced.

* * * * *